United States Patent Office 2,849,453
Patented Aug. 26, 1958

2,849,453

PIPERIDINES AND THEIR MANUFACTURE

Karl Hoffmann and Jules Heer, Binningen, Ernst Sury, Basel, and Ernst Urech, Binningen, Switzerland, assignors to Ciba Pharmaceutical Products, Inc., Summit, N. J.

No Drawing. Application December 20, 1954
Serial No. 476,598

Claims priority, application Switzerland
December 22, 1953

10 Claims. (Cl. 260—293)

This invention relates to the manufacture of 1-R-2-(1', 1'-di-Ph-R'-methyl)-piperidine compounds of the formula

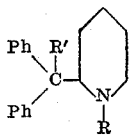

wherein the symbols Ph stand for phenyl radicals, R stands for hydrogen or a lower aliphatic hydrocarbon radical, e. g., lower alkyl, such as propyl, ethyl and especially methyl, and R' for a lower alkyl or lower hydroxyalkyl radical, e. g. methyl, ethyl, propyl, butyl, hydroxymethyl, hydroxyethyl, hydroxypropyl, and hydroxybutyl radicals, and salts of said compounds.

The new compounds can be used for medicaments because they exhibit a specific stimulating action on the central nervous system and also show spasmolytic effects. This type of combined action is of special interest since most spasmolytics by contrast show a central inhibition. Of special importance are the compounds which are unsubstituted at the ring nitrogen atom and in the phenyl radicals, primarily the 2-(1',1'-diphenyl-ethyl)-piperidine, and their salts.

The new piperidines are obtained by treating with a hydrogenating agent a 2-(1',1'-di-Ph-R'-methyl)-pyridine of the formula

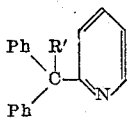

wherein R' and Ph have the meanings given above, or a quaternary derivative thereof, N-substituted with a lower aliphatic hydrocarbon radical. Resulting secondary piperidines can be substituted at the ring nitrogen atom with a low aliphatic hydrocarbon radical, and piperidines so obtained can be converted into salts thereof.

Those of the starting materials which are not known can be obtained, for instance, by reacting a suitably substituted diphenyl acetic acid nitrile with a 2-halogen-pyridine, then splitting off the functionally converted carboxyl group and introducing a low alkyl or hydroxyalkyl radical, and, if desired, quaternating the resulting pyridine compound.

The hydrogenation may be carried out with agents suitable for hydrogenating a pyridine ring. Thus, for example, the hydrogenation may be carried out with hydrogen in the presence of a hydrogenation catalyst, advantageously a noble metal catalyst, such as platinum, or in the presence of nickel or copper chromite or with nascent hydrogen, for example, by treatment with an alkali metal such as sodium in an alcohol such as butanol.

For the N-substitution of secondary piperidines, the usual methods may be used, e. g. reaction with formaldehyde to introduce an N-methyl group.

Depending on the procedure used the new compounds are obtained in the form of their bases or salts. The free piperidine bases can be obtained from the salts in known manner, e. g., by treatment with an alkali, e. g., alkali metal hydroxide. From the said bases there can be produced salts by reaction with acids which are suitable for the formation of therapeutically useful salts, for example, hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid or therapeutically active acids.

The new compounds can be used as medicaments, for example, in the form of pharmaceutical preparations which contain them in admixture with an adjuvant as a carrier which facilitates administration, e. g. a non-toxic, therapeutically useful pharmaceutical organic or inorganic solid or liquid carrier material suitable for enteral or parenteral application. For the production of these preparations such substances are concerned as do not react with the new compounds, as for example water, gelatine, lactose, starch, magnesium stearate, talc, vegetable oils, benzyl alcohols, gums, polyalkylene glycols, petroleum jelly, cholesterol, or other known medicament carriers. The pharmaceutical preparations can take the form of, for example, tablets or dragees, or are in liquid form as solutions, suspensions or emulsions. They are sterilized if desired, and/or may contain auxiliary substances such as preservatives, stabilizing, wetting or emulsifying agents, salts which vary the osmotic pressure or buffer substances. They may also contain other therapeutically valuable substances. The pharmaceutical preparations are formulated by the usual methods.

The following examples illustrate the inventions, parts being by weight unless otherwise stated, and the relationship of parts by weight to parts by volume being the same as that of the gram to the cubic centimeter:

*Example 1*

10.4 parts of 2-(1':1'-diphenyl-ethyl)-pyridine in 100 parts by volume of glacial acetic acid are agitated under hydrogen at 30–35° C. in the presence of 0.4 part of platinum oxide. When the quantity of hydrogen calculated for the hydrogenation of the pyridine nucleus (6 atomic proportions) has been absorbed, the catalyst is filtered off with suction and the filtrate is evaporated almost to dryness in vacuo. The oily residue is then dissolved in 100 parts by volume of water and mixed with an aqueous solution of ammonia. The precipitated base is taken up in ether, the ethereal extract washed with water and evaporated to dryness. There are obtained 10 parts of the desired 2-(1':1'-diphenyl-ethyl)-piperidine in the form of a colorless resin. By treatment with alcoholic hydrochloric acid there is obtained the hydrochloride melting at 278–280° C. (with decomposition). Other salts, e. g., the hydrobromide, sulfate, nitrate, phosphate, acetate and the like can be prepared in an analogous manner.

For preparing the 2-(1':1'-diphenyl-ethyl)-pyridine used as starting material 24.5 parts of 2-diphenyl-methyl-pyridine in 120 parts by volume of dioxane are mixed with 8 parts of powdered sodamide, and then treated at 70–80° C. with 15 parts of methyl iodide. The reaction mixture is then poured on to ice and the precipitated oil is taken up in ether. Finally, the ethereal solution is evaporated, after being washed and dried, and the residue is distilled in vacuo. The 2-(1':1'-diphenyl-ethyl)-pyridine passes over at 142–146° C. under 0.1 mm. pressure in the form of a viscous oil, which crystallizes throughout after standing for a short time. The crystals melt at 50–51° C.

The starting material used in Example 2, namely 2-(1':1'-diphenyl-propyl)-pyridine, is obtained in an analogous manner by using ethyl bromide or ethyl iodide as the alkylating agent instead of methyl iodide.

*Example 2*

10.7 parts of 2-(1':1'-diphenyl-propyl)-pyridine boiling at 140–142° C. under 0.1 mm. pressure are agitated in 200 parts by volume of alcohol under hydrogen at an initial pressure of 50 atmospheres at 90–100° C. in the presence of 10 parts of Rupe nickel [H. Rupe et al. Helv. Chim. Acta 1, 452 (1918)]. When the quantity of hydrogen calculated for 6 atomic proportions has been absorbed, the reaction solution is freed from nickel by filtration and evaporated in vacuo. In order to prepare the hydrochloride the residue of the evaporation is dissolved in a slight excess of alcoholic hydrochloric acid, and, after distilling off the alcohol, the residue is crystallized from a mixture of methanol and ethyl acetate. The colorless crystals of 2-(1':1'-diphenyl-propyl)-piperidine hydrochloride melt at 236–247° C. with decomposition.

*Example 3*

11.3 parts of 2-(1':1'-diphenyl-propyl)-piperidine are heated in a solution of 6.5 parts of formic acid and 6.5 parts of formaldehyde solution of 37 percent strength for 4 hours at a bath temperature of 110–120° C. The solvent is then distilled off in vacuo, and the residue is dissolved in an excess of alcoholic hydrochloride acid. The hydrochloride of 1-methyl-2-(1':1'-diphenyl-propyl)-piperidine crystallizes from a mixture of methanol and ethyl acetate in the form of needles melting at 222–225° C.

*Example 4*

8.7 parts of 2-(1':1'-diphenyl-2'-hydroxy-ethyl)-pyridine are agitated in 90 parts by volume of glacial acetic acid at 30–35° C. under hydrogen in the presence of 0.15 part of platinum oxide. When the quantity of hydrogen calculated for 6 atomic proportions has been absorbed the product is worked up as described in Example 1. The free base is an oil, and is converted by mixing it with alcoholic hydrochloric acid into the hydrochloride of 2-(1':1'-diphenyl-2'-hydroxyethyl)-piperidine melting at 203–204° C.

In order to prepare the starting material used in this example 15.8 parts of diphenyl-pyridyl-(2)-acetic acid ethyl ester are treated in 500 parts by volume of absolute ether at room temperature with 2 parts of lithium-aluminum hydride in portions and in an atmosphere of nitrogen. After allowing the whole to stand for a short time 50 parts by volume of ethyl acetate are added followed by the addition of 100 parts by volume of water. The organic layer is separated, washed with water, dried and evaporated to dryness. There is obtained almost in quantitative yield the desired 2-(1':1'-diphenyl-2'-hydroxyethyl)-pyridine, which, after recrystallization from methanol, crystallizes in the form of lustrous platelets melting at 120–121° C.

The diphenyl-pyridyl-(2)-acetic acid ester is obtained as follows:

A solution of lithium-phenyl is first prepared from 4.2 parts of lithium and 43 parts by volume of bromobenbene in 400 parts by volume of ether. The reaction mixture cooled to −10° C. is then mixed with a solution of 49 parts of 2-diphenylmethyl-pyridine in 150 parts by volume of ether, and is then mixed dropwise, while stirring, with a solution of 27 parts by volume of chloroformic acid ethyl ester in 50 parts by volume of ether. In this manner the blood red reaction solution is decolorized. The colorless reaction mixture is finally poured on to a mixture of ice and hydrochloric acid, rendered alkaline by the addition of potash, extracted with ether, and the ether evaporated. The free-diphenyl-pyridyl-(2)-acetic acid ethyl ester is recrystallized from a mixture of acetone and methanol and melts at 128° C.

*Example 5*

13 parts of 2-(1':1'-diphenyl-3'-hydroxypropyl)-pyridine in 500 parts by volume of n-butanol are treated at 135° C. in portions with 30 parts of sodium. When the vigorous reaction has finished, the reaction solution is extensively concentrated in vacuo and the residue is poured into water. The precipitated oil is taken up in ether, and the ethereal solution is washed until neutral and evaporated to dryness. After recrystallization from a mixture of acetone and hexane, the colorless small crystals of 2-(1':1'-diphenyl-3'-hydroxypropyl)-piperidine melt at 107–109° C.

In order to prepare the 2-(1':1'-diphenyl-3'-hydroxypropyl)-pyridine, the lithium compound is prepared in a manner analogous to that described in Example 4, from 24.5 parts of 2-diphenyl-methyl-pyridine, and the lithium compound in 350 parts by volume of ether is treated with a solution of 10 parts of ethylene oxide in 50 parts by volume of benzene at a low temperature (about −10° C.). After working up as described in Example 4, there is obtained 2-(1':1'-diphenyl-3'-hydroxypropyl)-pyridine in the form of dense crystals melting at 103° C.

*Example 6*

15.6 parts of 2-(1':1'-diphenyl-4'-hydroxybutyl)-pyridine in 150 parts by volume of glacial acetic acid are hydrogenated in a manner analogous to that described in Example 4 in the presence of 0.2 part of platinum oxide at 25–30° C. until the pyridine nucleus is saturated. By working up as described in Example 1 there is obtained the desired 2-(1':1'-diphenyl-4'-hydroxy-butyl) - piperidine, which crystallizes from ether in clusters melting at 130–131° C.

In order to prepare the starting material the lithium compound from 24.5 parts of 2-diphenylmethyl-pyridine in 200 parts by volume of ether is reacted with a solution of 15 parts of acrylic acid ethyl ester in 100 parts by volume of ether at −15° to −20° C. The reaction-mixture is finally poured onto ice and rendered alkaline by the addition of aqueous ammonia. The organic layer is taken up in ether, washed with water, and dried. The ether is evaporated and a good yield of 2-(1',1'-diphenyl-3'-carbethoxypropyl)-pyridine obtained, which crystallizes from isopropyl ether in the form of dense crystals melting at 97–98° C. With the aid of lithium-aluminium hydride in a mixture of benzene and ether there is obtained from the product as described in Example 4 the 2-(1':1'-diphenyl-4'-hydroxybutyl)-pyridine in the form of a colorless resin.

What is claimed is:

1. A member of the group consisting of piperidines of the following formula:

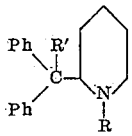

wherein R is selected from the group consisting of hydrogen, methyl, ethyl and propyl, R' is selected from the group consisting of lower alkyl and lower hydroxy alkyl, and each Ph stands for a phenyl radical, and therapeutically useful acid addition salts thereof.

2. 2-(1',1'-diphenyl-ethyl)-piperidine.

3. Therapeutically useful acid addition salts of the compound of claim 2.

4. The hydrochloride of the compound of claim 2.

5. 2-(1',1'-diphenyl-propyl)-piperidine.

6. Therapeutically useful acid addition salts of the compound of claim 5.
7. 2-(1',1'-diphenyl-butyl)-piperidine.
8. Therapeutically useful acid addition salts of the compound of claim 7.
9. 2-(1',1'-diphenyl-pentyl)-piperidine.
10. Therapeutically useful acid addition salts of the compound of claim 9.

References Cited in the file of this patent

Tilford et al.: JACS, vol. 76 pages 2331–41 (1954) (effective date Dec. 5, 1953).

Sugimoto et al.: Jour. of the Pharm. Soc. of Japan, vol. 73, pages 757–60, abstracted in Chem. Abst., vol. 48, columns 9367–68 (1953).